United States Patent [19]
Mason et al.

[11] Patent Number: 5,204,914
[45] Date of Patent: Apr. 20, 1993

[54] CHARACTER RECOGNITION METHOD USING OPTIMALLY WEIGHTED CORRELATION

[75] Inventors: James A. Mason, Rochester; Gregory J. Martin, Canandaigua, both of N.Y.; Robert Y. Chen, Seattle, Wash.; John F. Cook, Rochester, N.Y.

[73] Assignee: Eastman Kodak Company, Rochester, N.Y.

[21] Appl. No.: 753,150

[22] Filed: Aug. 30, 1991

[51] Int. Cl.$^5$ .............................. G06K 9/68
[52] U.S. Cl. ......................... 382/14; 382/30
[58] Field of Search ...................... 382/14, 15, 30, 39, 382/9, 26, 36

[56] References Cited

U.S. PATENT DOCUMENTS

| | | | |
|---|---|---|---|
| 3,267,431 | 8/1960 | Greenberg et al. | 382/14 |
| 3,275,985 | 9/1966 | Dunn et al. | 382/14 |
| 3,588,821 | 6/1971 | LaSalle et al. | 382/14 |
| 4,731,861 | 3/1988 | Blanton et al. | 382/9 |

Primary Examiner—Leo H. Boudreau
Assistant Examiner—David Fox
Attorney, Agent, or Firm—Raymond L. Owens

[57] ABSTRACT

A character recognition method comprising the following steps: (1) acquiring a two dimensional array of pixels, (2) locating an unknown character in the two dimensional array, (3) computing weighted correlation coefficients between the unknown character and a trained set of characters (i.e. a font), (4) recognizing the unknown character as the trained character with the highest weighted correlation coefficient above a threshold. The weights in the correlation calculations are adjusted to place more emphasis on those areas of a trained character that distinguishes it from all other trained characters in the training set. A method for optimally adjusting these weights is described herein.

7 Claims, 16 Drawing Sheets

| FIG.5A' |
|---------|
| FIG.5A" |

740 — 'ZERO'

```
0 255 255 255   0
255   0   0   0 255
255   0 255   0 255
255   0 255   0 255
255 255   0   0 255
255   0   0   0 255
  0 255 255 255   0
```

741 — 'ONE'

| FIG.5B' |
|---|
| FIG.5B" |

FIG.5B'

760 — 'ZERO'
```
128 128 128 128 128 128 128 128
128 128 128 128 128 128 128 128
128 128 128 128 128 128 128 128
128 128 128 128 128 128 128 128
128 128 128 128 128 128 128 128
128 128 128 128 128 128 128 128
128 128 128 128 128 128 128 128
128 128 128 128 128 128 128 128
```

761 — 'ONE'
```
128 128 128 128 128 128 128 128
128 128 128 128 128 128 128 128
128 128 128 128 128 128 128 128
128 128 128 128 128 128 128 128
128 128 128 128 128 128 128 128
128 128 128 128 128 128 128 128
128 128 128 128 128 128 128 128
128 128 128 128 128 128 128 128
```

| 128 | 128 | 128 | 128 | 128 |
|---|---|---|---|---|
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |

769 'G'

| 128 | 128 | 128 | 128 | 128 |
|---|---|---|---|---|
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |

770 'I'

| 128 | 128 | 128 | 128 | 128 |
|---|---|---|---|---|
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |

771 'O'

| 128 | 128 | 128 | 128 | 128 |
|---|---|---|---|---|
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |

772 'P'

| 128 | 128 | 128 | 128 | 128 |
|---|---|---|---|---|
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |

773 'Q'

| 128 | 128 | 128 | 128 | 128 |
|---|---|---|---|---|
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |

774 'R'

| 128 | 128 | 128 | 128 | 128 |
|---|---|---|---|---|
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |

775 'T'

| 128 | 128 | 128 | 128 | 128 |
|---|---|---|---|---|
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |
| 128 | 128 | 128 | 128 | 128 |

| | 'ZERO' | 'ONE' | '8' | '9' | 'B' | 'C' | 'D' | 'E' | 'F' | 'G' | 'I' | 'O' | 'P' | 'Q' | 'R' | 'T' |
|---|---|---|---|---|---|---|---|---|---|---|---|---|---|---|---|---|
| 'ZERO' | 100 | 1 | 43 | 31 | 35 | 49 | 51 | 6 | 2 | 37 | 1 | 70 | 10 | 51 | 1 | 1 |
| 'ONE' | 1 | 100 | 0 | 0 | 0 | 0 | 0 | 2 | 2 | 0 | 42 | 1 | 3 | 0 | 0 | 13 |
| '8' | 43 | 0 | 100 | 0 | 0 | 0 | 0 | 23 | 13 | 0 | 0 | 51 | 29 | 36 | 13 | 0 |
| '9' | 31 | 0 | 0 | 100 | 79 | 56 | 28 | 14 | 5 | 23 | 0 | 35 | 17 | 24 | 6 | 0 |
| 'B' | 35 | 0 | 0 | 79 | 100 | 70 | 56 | 44 | 28 | 31 | 0 | 46 | 56 | 29 | 0 | 0 |
| 'C' | 49 | 0 | 0 | 56 | 70 | 100 | 55 | 26 | 11 | 70 | 0 | 70 | 16 | 55 | 7 | 0 |
| 'D' | 51 | 0 | 0 | 28 | 44 | 55 | 100 | 18 | 10 | 43 | 0 | 79 | 24 | 59 | 9 | 0 |
| 'E' | 6 | 2 | 23 | 14 | 43 | 26 | 18 | 100 | 62 | 10 | 14 | 10 | 37 | 9 | 29 | 2 |
| 'F' | 2 | 2 | 13 | 5 | 28 | 11 | 10 | 62 | 100 | 3 | 1 | 3 | 68 | 0 | 45 | 4 |
| 'G' | 37 | 0 | 0 | 23 | 31 | 70 | 43 | 10 | 3 | 100 | 0 | 59 | 6 | 43 | 4 | 0 |
| 'I' | 1 | 42 | 0 | 0 | 0 | 0 | 0 | 14 | 1 | 0 | 100 | 0 | 0 | 0 | 0 | 61 |
| 'O' | 70 | 1 | 51 | 35 | 46 | 70 | 79 | 10 | 3 | 59 | 0 | 100 | 13 | 79 | 4 | 0 |
| 'P' | 10 | 3 | 29 | 17 | 56 | 16 | 24 | 37 | 68 | 6 | 0 | 13 | 100 | 6 | 70 | 0 |
| 'Q' | 51 | 0 | 36 | 24 | 29 | 55 | 59 | 9 | 0 | 43 | 0 | 79 | 6 | 100 | 9 | 4 |
| 'R' | 1 | 0 | 13 | 6 | 0 | 7 | 9 | 29 | 45 | 4 | 0 | 4 | 70 | 9 | 100 | 0 |
| 'T' | 1 | 13 | 0 | 0 | 0 | 0 | 0 | 2 | 4 | 0 | 61 | 0 | 0 | 4 | 0 | 100 |

| | 'ZERO' | 'ONE' | '8' | '9' | 'B' | 'C' | 'D' | 'E' | 'F' | 'G' | 'I' | 'O' | 'P' | 'Q' | 'R' | 'T' |
|---|---|---|---|---|---|---|---|---|---|---|---|---|---|---|---|---|
| 'ZERO' | 100 | 0 | 15 | 15 | 14 | 0 | 13 | 14 | 15 | 0 | 11 | 16 | 14 | 15 | 12 | 14 |
| 'ONE' | 0 | 100 | 0 | 0 | 0 | 0 | 0 | 0 | 0 | 0 | – | 0 | 0 | 0 | 0 | 0 |
| '8' | 30 | 0 | 100 | 31 | 32 | 31 | 13 | 32 | 32 | 31 | 0 | 31 | 32 | 31 | 32 | 0 |
| '9' | 0 | 0 | 1 | 100 | 0 | 0 | 0 | 0 | 0 | 0 | 0 | 0 | 0 | 0 | 0 | 0 |
| 'B' | 36 | 15 | 53 | 53 | 100 | 26 | 54 | 51 | 46 | 40 | 24 | 29 | 53 | 27 | 50 | 12 |
| 'C' | 0 | – | 0 | 0 | 0 | 100 | 0 | – | – | 0 | – | 0 | 0 | 0 | 0 | – |
| 'D' | 12 | 7 | – | 1 | 29 | 0 | 100 | 26 | 27 | 0 | 29 | 29 | 28 | 26 | 26 | 7 |
| 'E' | 9 | 0 | 29 | 26 | 30 | 17 | 9 | 100 | 30 | 9 | 32 | 9 | 11 | 30 | 29 | 0 |
| 'F' | 0 | 0 | 0 | 0 | 0 | 0 | 0 | – | 100 | 0 | 0 | 0 | 0 | – | 0 | 0 |
| 'G' | 0 | 0 | – | – | 0 | – | – | – | – | 100 | 0 | – | – | – | – | – |
| 'I' | 5 | 23 | 4 | 6 | 11 | 5 | 14 | 24 | 0 | 5 | 100 | 5 | 0 | 14 | 3 | 0 |
| 'O' | 0 | 0 | 0 | 0 | 0 | 0 | 0 | 0 | 0 | 0 | 0 | 100 | 0 | 0 | 0 | 0 |
| 'P' | 3 | – | 7 | 7 | 12 | 0 | 7 | 17 | 5 | 0 | – | 0 | 100 | 0 | 13 | 0 |
| 'Q' | 22 | 25 | 8 | 8 | 4 | 18 | 17 | 10 | 4 | 16 | 21 | 29 | 4 | 100 | 25 | 0 |
| 'R' | 3 | 13 | 0 | 0 | 0 | 3 | 3 | 0 | 13 | 2 | 14 | 3 | 14 | 14 | 100 | 9 |
| 'T' | 0 | 0 | 0 | – | 0 | – | 0 | 0 | 0 | 0 | – | 0 | 0 | 0 | 0 | 100 |

FIG.5E'

800 'ZERO'
```
42  27   0  27   0
27  40  48   0  27
 0   0  48 255  27
91  68 253  68 226
27 255  48   0  27
27   0  48   0  27
57   0   0   0  40
```

801 'ONE'
```
165 165  74 165 165
 99 176  74  99  99
176  99  74  99  99
 99  99  74  99  99
 99  99  74  99  99
 99  99  74  99  99
 74  74  74  74  74
```

802 '8'
```
253   0   0   0   0
  0   0   0   0   0
  0   0   0  32   0
255 149   0 149  32
204  32   0   0   0
204   0   0   0   0
253   0   0   0   0
```

803 '9'
```
 50  37  37  37  65
 37  65  65  65  37
 37  65  37  37  65
 50  37  37  65  65
245  65  50  65  65
245  65  65   0  50
 50   0   0   0  50
```

804 'B'
```
206   0   0   0  68
  0   0   0   0 104
  0   0   0   0 104
206 167 167 167 210
  0   0   0   0 222
  0   0   0   0 222
206 107 107 107  68
```

805 'C'
```
91   0   0   0  91
 0  64  64  75  36
 0  75  64  75 164
 0  91  80  91 164
 0  75 169 173 227
 0  75  64  75  36
80   0   0   0  80
```

806 'D'
```
254   0   0   0  67
 24   0  67   0  24
 24   0  67   0  24
 24 144 255 144 255
 24   0  67   0  24
 24   0  67   0  24
254   0   0   0  67
```

807 'E'
```
  0   0   0   0 138
 77   0 129   0 141
 77   0 129   0 141
 77 185   0 185   0
 77   0 129   0 141
 77   0 129   0 141
  0 174 174 174 255
```

| FIG.5E' |
|---------|
| FIG.5E" |

| 0 | 0 | 28 | 0 | 69 |
|---|---|---|---|---|
| 0 | 0 | 60 | 0 | 165 |
| 37 | 0 | 60 | 0 | 165 |
| 0 | 0 | 28 | 0 | 0 |
| 0 | 0 | 60 | 0 | 0 |
| 0 | 0 | 60 | 0 | 0 |
| 37 | 152 | 245 | 152 | 152 |

809 'G'

| 52 | 26 | 26 | 26 | 14 | 0 |
|---|---|---|---|---|---|
| 31 | 25 | 99 | 25 | 25 | 180 |
| 31 | 25 | 99 | 0 | 139 | 0 | 128 |
| 52 | 0 | 139 | 0 | 128 | |
| 31 | 25 | 164 | 253 | 141 | |
| 31 | 25 | 99 | 28 | 53 | |
| 52 | 38 | 26 | 38 | 52 | |

810 'I'

| 0 | 0 | 0 | 0 | 0 |
|---|---|---|---|---|
| 91 | 247 | 0 | 0 | 0 |
| 252 | 0 | 0 | 91 | 0 |
| 91 | 91 | 0 | 0 | 0 |
| 91 | 0 | 0 | 0 | 0 |
| 91 | 0 | 0 | 0 | 0 |
| 117 | 117 | 0 | 117 | 117 |

811 'O'

| 0 | 0 | 0 | 0 | 0 |
|---|---|---|---|---|
| 193 | 0 | 0 | 0 | 0 |
| 0 | 0 | 0 | 146 | 15 |
| 0 | 0 | 0 | 146 | 15 |
| 0 | 0 | 0 | 146 | 0 |
| 0 | 0 | 0 | 0 | 175 |
| 193 | 0 | 0 | 0 | 175 |

812 'P'

| 48 | 0 | 0 | 0 | 120 |
|---|---|---|---|---|
| 0 | 0 | 0 | 0 | 103 |
| 0 | 0 | 0 | 34 | 103 |
| 0 | 48 | 0 | 48 | 34 |
| 0 | 34 | 188 | 0 | 145 |
| 0 | 0 | 0 | 188 | 145 |
| 48 | 145 | 145 | 145 | 188 |

813 'Q'

| 119 | 0 | 0 | 0 | 0 |
|---|---|---|---|---|
| 0 | 0 | 0 | 0 | 0 |
| 0 | 0 | 0 | 119 | 117 |
| 0 | 119 | 119 | 119 | 117 |
| 0 | 0 | 119 | 0 | 117 |
| 0 | 0 | 0 | 254 | 117 |
| 119 | 117 | 117 | 117 | 254 |

814 'R'

| 57 | 0 | 0 | 0 | 33 |
|---|---|---|---|---|
| 22 | 0 | 35 | 0 | 33 |
| 22 | 0 | 35 | 0 | 33 |
| 22 | 159 | 17 | 159 | 21 |
| 22 | 0 | 254 | 0 | 21 |
| 22 | 0 | 35 | 254 | 21 |
| 17 | 196 | 196 | 196 | 229 |

815 'T'

| 0 | 52 | 52 | 52 | 0 |
|---|---|---|---|---|
| 85 | 0 | 96 | 0 | 85 |
| 85 | 0 | 96 | 0 | 85 |
| 85 | 0 | 96 | 0 | 85 |
| 85 | 0 | 96 | 0 | 85 |
| 85 | 0 | 96 | 0 | 85 |
| 198 | 191 | 52 | 191 | 191 |

CHARACTER RECOGNITION METHOD USING OPTIMALLY WEIGHTED CORRELATION

FIELD OF THE INVENTION

This invention relates to weighted correlation methods for performing character recognition whereby the best match (i.e. highest correlation score) is used to select and classify an unknown character as a member of a trained set of characters. The correlations are computed from the two dimensional array of pixels for the unknown character and the training set of characters. In this specification, the term font training denotes the process of creating and storing all of the trained characters in a font. The term inspect denotes the process of recognizing each unknown character as one of the trained characters of a font. In this invention, the light value of each pixel is weighted to place more or less emphasis on its contribution to the overall correlation score. The weights are adjusted so as to provide optimal discrimination (decorrelation) among the characters in the training set. The method for automatically adjusting these weights is described herein.

BACKGROUND OF THE INVENTION

Correlation is a technique well known to those skilled in the art of developing character recognition methods. The process of recognizing an unknown character using correlation is comprised of the following steps: (1) acquiring a two dimensional array of pixels, (2) locating an unknown character in the two dimensional array, (3) computing the correlations between the unknown character and every member of a trained set of characters (otherwise known as a font), (4) recognizing the unknown character as the trained character with the highest associated correlation coefficient above a threshold.

The correlation between an unknown character and a trained character can be conveniently described mathematically using vector notation. That is, let the vector y denote the light values (relative scene reflectance, intensities, etc.) of the pixels of the unknown character to be recognized. That is, let $$y = [y_1, y_2, \ldots, y_N]^T \quad (1)$$

where $y_i$ denotes the light value of the i-th pixel of the unknown character and $T$ denotes the transpose operator. In this representation there are N pixels in the unknown character y. That is, the two dimensional array of pixels for the unknown character is represented as a one dimensional array by concatenating rows (or columns) into one vector.

In a similar manner, let x denote the vector of light values of a trained character from a font, i.e.

$$x = [x_1, x_2, \ldots, x_N]^T \quad (2)$$

where $x_i$ denotes the light value of the i-th pixel of the trained character x. For simplicity, it is assumed that both the unknown character and the trained characters have the same number of pixels, N. If this were not true, the two vectors can be made the same size by appropriately increasing/decreasing the size of the unknown character y to that of the trained character x by utilizing the surrounding pixels in the image.

With these definitions, the correlation $R_{xy}$ between the unknown character y and the trained character x can be written as $$R_{xy} = x^T \cdot y \quad (3)$$
$$= \Sigma x_i y_i \quad (4)$$

where the sum is over all N pixels.

According to the above description, $R_{xy}$ is computed for all M trained characters of the font $\{x_0, x_1, \ldots, x_M\}$ and unknown character y is recognized as being equivalent to that trained character $x_i$ that results in the highest correlation score among all the scores calculated.

An additional condition for a match is that the highest correlation score $(R_{xy})_{max}$ exceed some predetermined threshold $(R_{xy})_{thresh}$. Otherwise, the unknown character does not match any trained characters from the font.

The above describes the standard method of performing character recognition using correlation of the light value of pixels of an unknown character and trained characters from a font. The above method may not work well when trained characters from a font are highly correlated among themselves and measurement noise is significant. For example, consider the letters O and Q of a particular font. These two characters can be quite similar (highly correlated) to each other. Depending on the font type and magnification selected in capturing the image, the O may only be distinguished from the Q by the light value of one or two pixels. This implies that the correlation score, $R_{OQ}$, will be high and that discriminating an O from a Q can be difficult. In the presence of high levels of noise associated with capturing the image (i.e. video noise, sampling artifacts, lighting and printing variations), it is possible that an incorrect decision will be made and an O will be mistaken for a Q. For example, this can occur when the unknown character is a Q and $R_{OQ}$ exceeds $R_{QQ}$. In this case, the Q is incorrectly classified (recognized) as an O.

There are several obvious approaches to reducing these types of errors. These approaches include: (1) choosing a font such that the trained characters are as dissimilar as possible; (2) increasing the magnification to generate more pixels that aid in better discriminating among the trained characters of the font; (3) reducing the system level of noise. Unfortunately, it is not always possible to alter these conditions. That is: (1) the font type may be dictated by the application; (2) magnification may be fixed by other constraints; (3) the system noise level may not be easily lowered.

SUMMARY OF THE INVENTION

This invention describes another approach to minimizing classification errors in character recognition. In this invention, a method is developed that places more emphasis (higher weight) on those pixels that distinguish a trained character in a font from other highly correlated trained characters of the font. For the example cited above, more emphasis (increased weight) is placed on the pixels in the tail region of the Q for both the O and the Q.

In this invention, there are two separate processes in performing character recognition: font training and inspect. During font training, the trained characters are created and stored to memory for later use during inspect. Also, the weights for each trained character are optimally adjusted during font training using the method described herein. These weights are used during the inspect step to recognize all unknown characters.

The procedure for altering the weights of the pixels of a trained character is accomplished by introducing a weight (squared) matrix $Z_x$ for each trained character x in the font. Thus, $Z_x$ is an $N \times N$ matrix defined by $$Z = W^2 \tag{5}$$

where $$Z = \begin{bmatrix} z_1 & & & \\ & z_2 & & 0 \\ & & \cdot & \\ & & & \cdot \\ 0 & & & \cdot \\ & & & & z_N \end{bmatrix} = \begin{bmatrix} w_1^2 & & & \\ & w_2^2 & & 0 \\ & & \cdot & \\ & & & \cdot \\ 0 & & & \cdot \\ & & & & w_N^2 \end{bmatrix} \tag{6}$$

Note that although $Z_x$ is an $N \times N$ matrix, there are only N non-zero terms along the diagonal. These terms correspond to the individual weights (squared) for each pixel in the trained character x. Hence, the actual values that need to be stored for each trained character are the contents of the weight vector $w = [w_1, w_2, \ldots, w_N]^T$.

Thus, each trained character x of a font has two associated vectors: an observation vector x and an associated weight vector $w_x$.

The correlation $R_{xy}$ given above in equation (3) is modified to include the pixel weighting terms as follows:

$$R_{xy} = x^T \cdot Z_x \cdot y \tag{7}$$
$$= \Sigma x_i z_i y_i \tag{8}$$
$$= \Sigma x_i w_i^2 y_i \tag{9}$$
$$= \Sigma (x_i w_i)(y_i w_i) \tag{10}$$
$$= x_w^T \cdot y_w \tag{11}$$

where $$x_w = W \cdot x = [x_1 w_1, x_2 w_2, \ldots, x_N w_N]^T \tag{12}$$

and $$y_w = W \cdot y = [y_1 w_1, y_2 w_2, \ldots, y_N w_N]^T \tag{13}$$

In the above expressions, the weights w and weight (squared) z terms are associated with the trained character x. Equations (7) thru (13) show explicitly several different ways for computing the weighted correlation coefficient. That is, it can be computed in terms of the unknown character y and the trained character x and its associated weight (squared) matrix $Z_x$ or it can be computed in terms of a weighted trained character $x_w$ and a weighted unknown character $y_w$. The two expressions are equivalent and provide insight into different approaches in implementing a weighted correlation algorithm.

Equations (7) thru (13) above show how a weighted correlation coefficient can be computed. The goal is to develop a method to adjust the weights $w_x$ for each trained character $x_i$ of a font such that the correlations of $x_i$ with every other trained character of the font $\{x_j, j=1,2,\ldots,M, j \neq i\}$ are minimized. This is a constrained optimization problem and methods for solving these problems are well known to those skilled in the art. The approach to solving an optimization problem can be generally classified as either as a First Order Method or a Second Order Method. First Order Methods require the calculation of the first derivative of the function to be optimized. Typical First Order methods are the Gradient Method and the Steepest Ascent Methods. Second Order Methods require the calculation of the first and second derivatives of the function to be optimized. The Steepest Ascent Method is the simplest to implement and is described in this invention. The Gradient Method and the Second Order Methods can also be used and results in a reduction in the number of iterations to reach the optimum.

In order to compute the maximum/minimum of a function with respect to a set of variables, the gradient of the function with respect to those variables is computed using an initial guess (starting estimates) of those values. Next, the gradient is multiplied by a scaling constant and is added/subtracted to the initial estimates of the variables. The function is recomputed using the new estimates of the variables and tested to see if its value has increased/decreased sufficiently enough to stop the process. If not, the gradient is recomputed using the new estimates of the variables, scaled, and added to the previous estimates of the variables. The process is repeated until either: the maximum/minimum of the function is reached, no additional improvement is observed, or a maximum count of the number of iterations is exceeded.

The gradient of the correlation coefficient $R_{xy}$, as defined in equation (7), with respect to the weights (squared) $Z_x$ is defined as $$\nabla_Z R_{xy} = \partial R_{xy}/\partial Z_x \tag{14}$$

where $\nabla_Z$ is the gradient operator and is defined as $\partial^{\cdot\cdot}/\partial Z_x$.

The i-th component of the gradient is easily shown (from equation (8)) to be $$(\nabla_Z R_{xy})_i = \partial R_{xy}/\partial z_{x,i} = x_i y_i \tag{15}$$

As stated above, in order to minimize $R_{xy}$, the weights (squared) for the trained character x are adjusted recursively by subtracting a scaled version of the gradient, i.e.

$$Z_x(k+1) = Z_x(k) - \alpha \nabla_Z R_{xy} \tag{16}$$

where k is the time index, $\alpha$ is a scaling constant and the correction is understood to apply to the diagonal elements of the weight (squared) matrix (since the off-diagonal terms are always zero). This procedure is repeated until: the optimum is reached, no additional improvement is observed, or a maximum iteration count is exceeded.

For a single pair of trained characters, equation (15) shows that the gradient is a constant, independent of the weights. Thus, the optimum can be computed directly.

As a simple example, consider a font consisting of two trained characters x and y. Let $x = [1\ 0]^T$, $y = [1\ 1]^T$ and $$W_x(0) = \begin{bmatrix} 1 & 0 \\ 0 & 1 \end{bmatrix} = W_y(0)$$

Then from equation (7), $$R_{xy} = [1\,0]\begin{bmatrix}1 & 0\\0 & 1\end{bmatrix}\begin{bmatrix}1\\1\end{bmatrix}$$
$$= 1.$$

From equation (15), the gradient is $\nabla_Z R_{xy}=[1\ 0]^T$. Since the initial weights are unity, then $Z_x(0)=W_x(0)$ and application of equation (16) with $\alpha=1$ results in $$W_x(1) = \begin{bmatrix}1 & 0\\0 & 1\end{bmatrix} - (1)\begin{bmatrix}1 & 0\\0 & 0\end{bmatrix}$$
$$= \begin{bmatrix}0 & 0\\0 & 1\end{bmatrix}$$

The new correlation is computed using equation (7) with the updated weight (squared) matrix as $$R_{xy} = [1\,0]\begin{bmatrix}1 & 0\\0 & 1\end{bmatrix}\begin{bmatrix}1\\1\end{bmatrix}$$
$$= 0.$$

Thus, the trained character x has been decorrelated with the trained character y by adjusting x's weights.

In a similar manner the weights for trained character y are adjusted resulting in $$W_y(1) = \begin{bmatrix}0 & 0\\0 & 1\end{bmatrix}$$

and thus $R_{xy}=0$, i.e. trained character y is no longer correlated with trained character x.

The above example, though contrived, illustrates the basic ideas in adjusting the trained characters weights. However, the weighted correlation as defined in equation (7) has some undesirable properties. Namely, the correlation $R_{xy}$ in equation (7) is sensitive to variations in illumination level and character contrast. (This is also true for the unweighted correlation as given in equation (3) above.) For the example cited above, doubling the intensity of character y to $[2\ 2]^T$ results in an increase in the initial correlation from 1 to 2. Hence the correlation computation must be modified to render it insensitive to contrast and illumination level variations. This is accomplished by computing a weighted normalized mean-corrected correlation.

The weighted normalized mean-corrected correlation (squared) $R^2_{xy}$ is defined as $$R^2_{xy} = \frac{[x_c^T Z_x y_c]^2}{[x_c^T Z_x x_c][y_c^T Z_x y_c]} \quad (17)$$

where $$x_c = x - m_x \quad (17a)$$
$$y_c = y - m_y \quad (17b)$$

are the mean-corrected characters where $$x_c^T = [x_{c,1} x_{c,2} \ldots x_{c,N}]^T \quad (17c)$$
$$y_c^T = [y_{c,1} y_{c,2} \ldots y_{c,N}]^T \quad (17d)$$

and the i-th components of the mean vectors are given by $$(m_x)_i = \Sigma x_i / N, \ i=1,2,\ldots,N \quad (17e)$$

$$(m_y)_i = \Sigma y_i / N, \ i=1,2,\ldots,N \quad (17f)$$

and $Z_x$ is the weight (squared) matrix as defined previously in equations (5) and (6).

Equation (17a) shows that the correlation (squared) $R^2_{xy}$ is computed rather than the correlation $R_{xy}$ as a mathematical convenience to avoid having to compute the square root. Note that $R^2_{xy}$ as given by equation (17a) is bounded in the range of zero to one and is insensitive to lighting or contrast variations. This can be easily proved (by those skilled in the art).

The gradient of the weighted normalized mean-corrected correlation (squared) with respect to the weights (squared) is defined as $$\nabla_Z R^2_{xy} = \partial R^2_{xy}/\partial Z_x = (2R_{xy})(\nabla_Z R_{xy}) \quad (18)$$

The i-th component of the gradient is defined as:

$$(\nabla_Z R^2_{xy})_i = \partial R^2_{xy}/\partial z_{x,i}$$

By partial differentiation of (18), it can be shown that the i-th component of the gradient of the weighted normalized mean-corrected correlation (squared) is given by $$(\nabla_Z R^2_{xy})_i = R^2_{xy}\left[\frac{2x_{c,i}y_{c,i}}{[x_c^T Z_x y_c]} - \left(\frac{x^2_{c,i}}{[x_c^T Z_x x_c]} + \frac{y^2_{c,i}}{[y_c^T Z_x y_c]}\right)\right] \quad (19)$$

In a manner similar to that of equation (16), the weights are adjusted recursively to minimize $R^2_{xy}$ by subtracting a scaled version of the gradient, i.e.

$$Z_x(k+1) = Z_x(k) - \alpha \nabla_Z R^2_{xy} \quad (20)$$

where k is the time index, and $\alpha$ is a scaling constant.

The object of this invention is to significantly reduce the possibility of incorrectly classifying an unknown character with respect to a trained character set (font). This is accomplished by placing more emphasis, i.e. increasing the weight, on those pixels that distinguish a trained character from every other trained character in the font and repeating this for every trained character in the font until the correlations among the trained characters in the font are reduced to an acceptable level or until it is determined that the correlations can not be reduced any further. More particularly, in accordance with this invention, a method of character recognition, comprises the steps of:

1) font training or creating a font of trained characters by:
   (a) acquiring an image composed of a two dimensional array of pixels;
   (b) locating all of the characters in the image by selectively scanning columns or rows of a predetermined area of the image and comparing each pixels intensity with a reference level to determine the first pixel of each character and recording the location (column and row coordinates) of such pixel and identifying the other pixels adjacent to the first whose intensity also exceeds the reference level and recording the upper left and lower right coordinates of a box bounding each character;

(c) identifying (labeling) all located characters and entering such identified characters as trained characters in memory;

(d) creating a set of weights, initialized to a constant value, for all trained characters of the training set;

(e) computing a correlation matrix composed of weighted correlation coefficients for all possible pairs of trained characters comprising the trained character set;

(f) searching through the correlation matrix and identifying the character corresponding to the row of the correlation matrix containing the most highly correlated pair of trained characters;

(g) adjusting the weights of the trained character identified in (f);

(h) recomputing the row of the correlation matrix corresponding to the trained character identified in (f) using the adjusted weights computed in (g); and (i) repeating steps (f) thru (h) until the highest correlation in the correlation matrix is reduced to an acceptable level or until a maximum count is exceeded and eliminating those trained characters from this iterative process that have been selected an excessive number of times; and 2) recognizing unknown characters by:

(j) acquiring a two dimensional array of pixels;

(k) locating all unknown characters in a manner described in (b);

(l) computing weighted correlation coefficients using the weights determined in steps (a) thru (i) between all unknown characters and the trained character set; and (m) identifying all unknown characters as those trained characters with the highest weighted correlation coefficients above a threshold.

DESCRIPTION OF THE DRAWINGS

FIG. 3A shows the flow chart illustrating the decision logic to choose inspect or training. FIG. 3B shows the flow diagram for the inspect control logic. FIG. 3C shows the flow diagram for the Font Training logic. FIG. 3D shows the flow diagram illustrating the weight optimization portion of the Font Training logic;

FIGS. 4' and 4" shows an example of applying the weight adjustment procedure to a three character font; and FIGS. 5A', 5A", 5B', 5B", 5C, 5D, 5E' and 5E" shows an example of applying the weight adjustment procedure to a sixteen character font.

Attached is APPENDIX A which is a C Program for performing the weight adjustment. The various modules (C callable functions) of this program will be referred to with reference to the various items of FIG. 3C and FIG. 3D.

DETAILED DESCRIPTION OF THE PREFERRED EMBODIMENT

Figure 1:
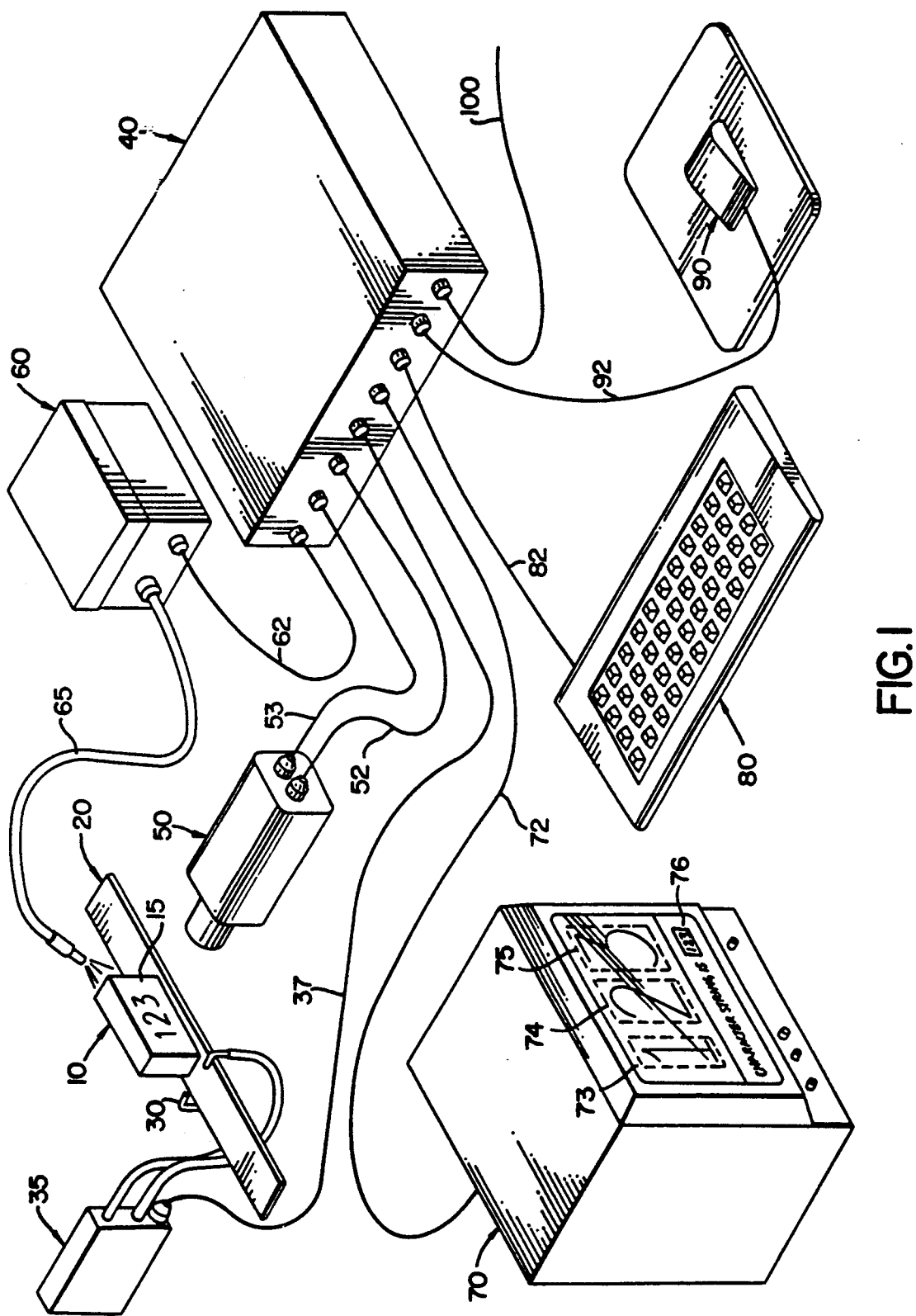
FIG. 1 is an illustration of an embodiment of the character recognition method in accordance with the present invention.

Referring to FIG. 1, there is shown the components of the preferred embodiment. There is a part 10 with printed characters 15 that are to be recognized. The part is moving on a conveyance unit 20 and is detected by an electro-optic sensor 30. Upon detection of the part, the electro-optic position sensor sends a signal to the sensor transducer unit 35. The transducer signals the logic and control unit 40 that the part is present in the field of view of the video camera 50 via the part detect cable 37.

Upon receipt of the part detect signal, the logic and control unit commands a stroboscopic light source 60 via the light source trigger cable 62 to generate a pulse of light given that the video camera is ready to capture the next video frame. The logic and control unit knows when the camera is ready to capture the next video frame since it controls the timing of the camera via the video synch cable 53.

The pulsed light from the stroboscopic light source illuminates the moving part via the fiber-optic bundle 65. The pulsed light essentially "freezes" the moving part and renders a sharp image of it when captured by the video camera 50.

Upon the capture of an image, the analog video signal is transferred from the camera to the logic and control unit 40 via the video cable 52. The logic and control unit displays the processed video image along with superimposed text on a video monitor 70 via the monitor cable 72. The type of information displayed on the monitor depends on whether the logic and control unit is in the training mode or the inspect mode, the details of which are described below with reference to FIGS. 3B and FIG. 3C. The example monitor display of FIG. 1 shows the results of an sample inspection. The captured image is displayed and boxes 73, 74 and 75 are drawn around the three characters that the logic and control unit has located in this example. Also shown on the monitor is textual information 76 indicating what classification the logic and control unit has assigned to the three located characters (in this example they are shown correctly classified as the letters '1', '2', and '3') as the result of an inspection.

A keyboard 80 and a pointing device (mouse) 90 are also shown to provide a means for user input to the logic and control unit. The keyboard is interfaced to the logic and control unit via the keyboard cable 82. The pointing device is interfaced to the logic and control unit via the pointing device cable 92.

An interface to a host computer 100 provides a means for communicating the results of the inspection to another processing unit for defect sorting and/or statistical analyses.

Figure 2:
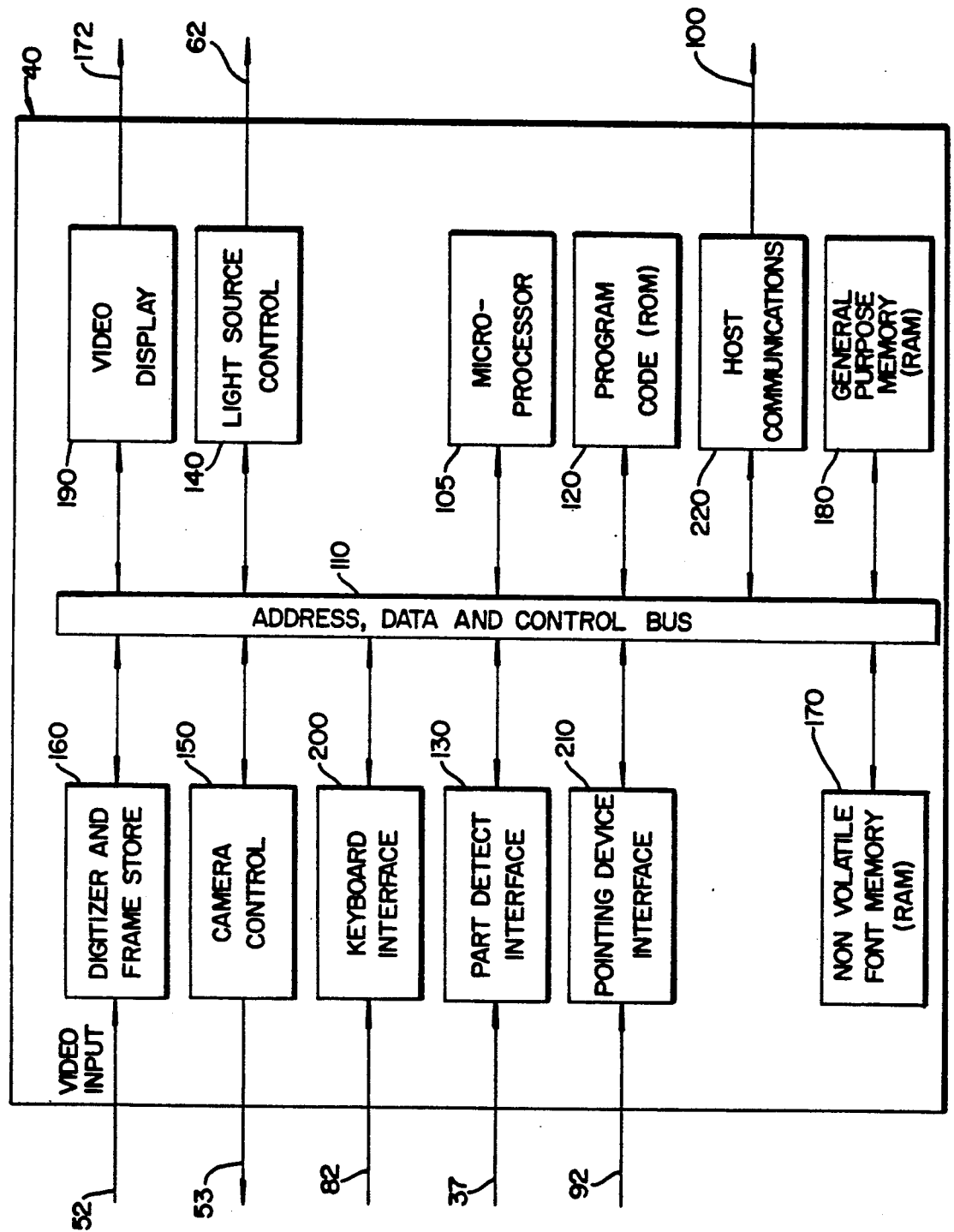
FIG. 2 is a schematic of the logic and control unit 40 of FIG. 1.

FIG. 2 shows in block diagram form the components of the logic and control unit 40, the details of which are described below. A microprocessor 105 acts as the main controller of the logic and control unit and receives input and provides output to the other components of FIG. 2 via the address, data, and control bus 110. The microprocessor receives its' instructions from program code stored in nonvolatile memory (ROM) 120.

A part detect interface 130 receives the part detect signal from the sensor transducer unit 35 via the part detect cable 37. The part detect interface signals the microprocessor when a part is in the field of view of the video camera. The microprocessor triggers the light source 60 via the light source interface 140 at the precise instant in time when the camera 50 is capable of capturing a video frame. The camera control module 150 provides the timing signals to the camera via the video sync cable 53 and alerts the microprocessor when the camera is ready to capture the next video frame.

The analog video output from the camera is digitized and stored upon command from the microprocessor by the digitizer and frame store module 160. The digitized video is accessible by the microprocessor for locating characters and computing correlation coefficients in a manner described below with reference to FIGS. 3B thru 3D.

The data associated with the trained characters of a font are stored in a block of memory, preferably nonvolatile, labeled font memory 170. Font memory contains all the pixel data associated with each trained character including the mean vectors and the weight vectors that are used to compute weighted correlation coefficients. The trained character data are addressed by the microprocessor via a list of pointer references stored in the general purpose memory 180. The general purpose memory provides a means for storing additional data as described below with reference to FIGS. 3A thru 3D.

The video data from the digitizer and frame store 160 are displayed on a monitor by means of the video display module 190 and the monitor cable 72. The microprocessor has the capability of overlaying graphics and textual information on top of the video to provide the user a means of viewing the results of an inspection and to prompt the user during font training.

The keyboard interface module 200 and the pointing device interface module 210 provide the interface from the keyboard and pointing device units and alerts the microprocessor when a key is pressed.

The host communications module 220 provides the interface from the microprocessor to a host computer and provides the gateway for sending the results of an inspection for subsequent sorting or statistical analysis.

Figure 3A:
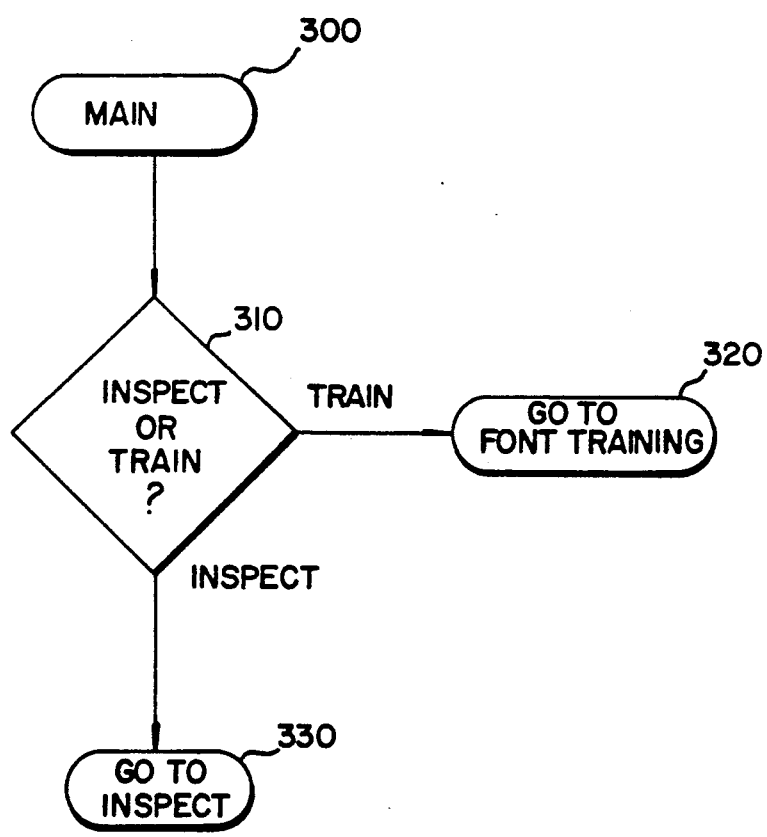
FIG. 3A thru 3D are flow charts illustrating an embodiment of the control logic followed by the logic and control unit 40 of FIG. 2.

FIG. 3A shows a flow diagram illustrating a portion of the logic followed by the logic and control unit 40. Control begins with the main label 300. This is the beginning of the control loop. The user is then queried as to whether the unit is to inspect or a font is to be trained 310. This question appears on the video monitor 70. The user responds via the keyboard 80 or pointing device 90 and control is directed either to font training 320 or inspect 330.

Figure 3B:
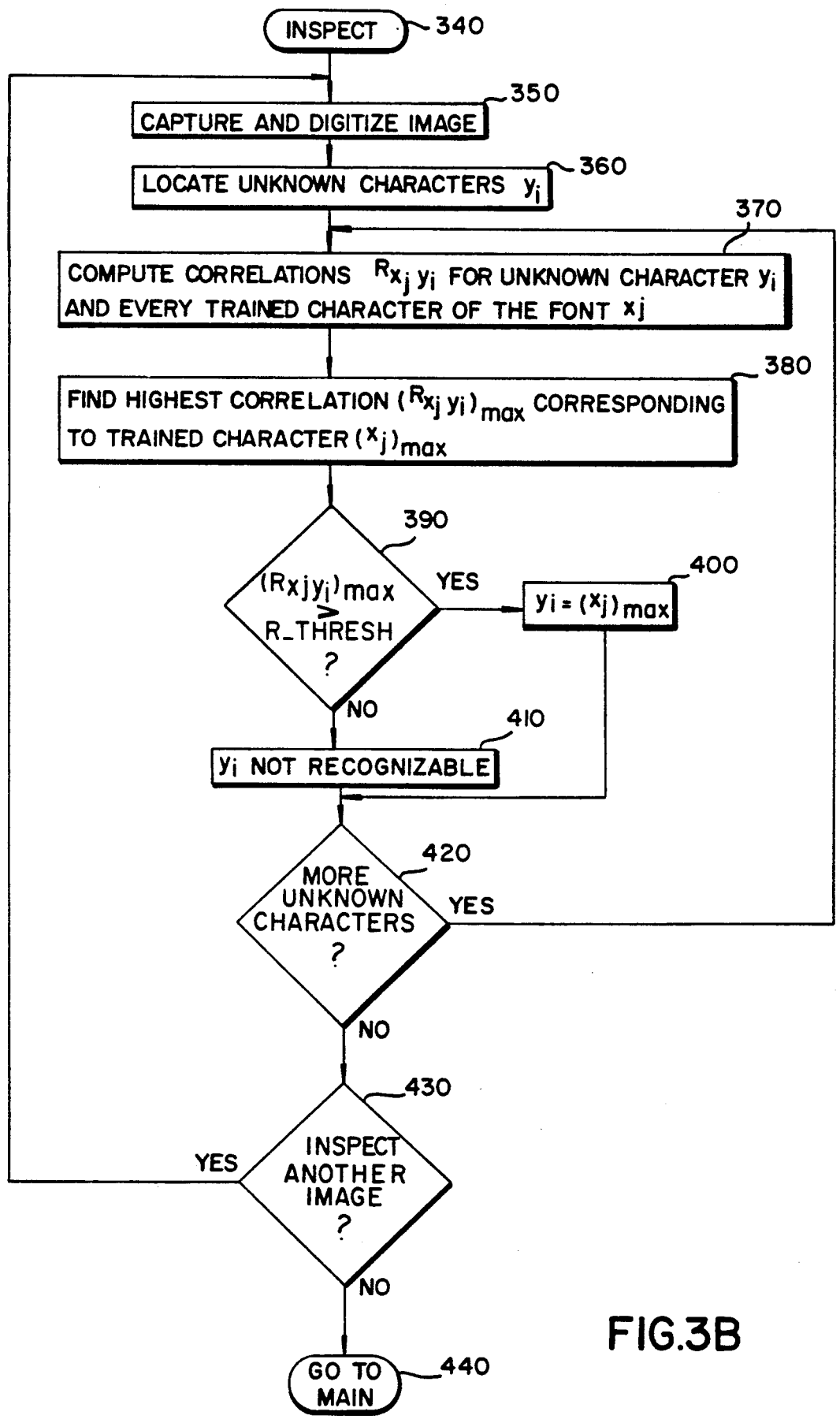

FIG. 3B shows a flow diagram illustrating the inspect portion of the logic followed by the logic and control unit 40. Inspect begins with the inspect label 340 and is followed by the capture and digitization of an image 350 step upon the receipt of a part detect signal as discussed previously with reference to FIG. 1 and FIG. 2.

Next, all of the unknown characters are located in a predefined region of interest in the image 360. This is accomplished by selectively scanning columns or rows of the predefined area of the image and comparing the light value of each pixel with a reference value to determine the first pixel of each unknown character and recording the location (column and row coordinates) of such pixel and identifying the other pixels adjacent to the first whose intensity also exceeds the same reference level and thus determining and recording the upper left and lower right coordinates of a box bounding each character. Once all of the unknown characters have been located, each unknown character $y_i$ is then recognized by computing the weighted normalized mean-corrected correlation (squared) $R^2_{xy}$ according to equation (17) with every trained character of the font $x_j$ j = 1,2, . . . , M where M is the number of trained characters in the font 370.

Next, the trained character $(x_j)_{max}$ corresponding to the highest correlation $(R^2_{xy})_{max}$ is determined by sorting the correlation scores 380. A comparison is made of the highest correlation score $(R^2_{xy})_{max}$ with a predetermined threshold $R_{thresh}$ 390. If the threshold is exceeded, then the unknown character $y_i$ is identified as $(x_j)_{max}$ 400 and is reported to the user via the video monitor 70 and to the host computer via the host computer interface 100. Otherwise, the unknown character is judged as not recognizable 410 and is reported to the user and the host computer as such. A test is made to check for additional unknown characters 420 and if true then steps 370 thru 410 are repeated. The logic and control unit will loop back to capture another image if in a continuous inspect mode 430, otherwise it will branch back to main 440.

Figure 3C:
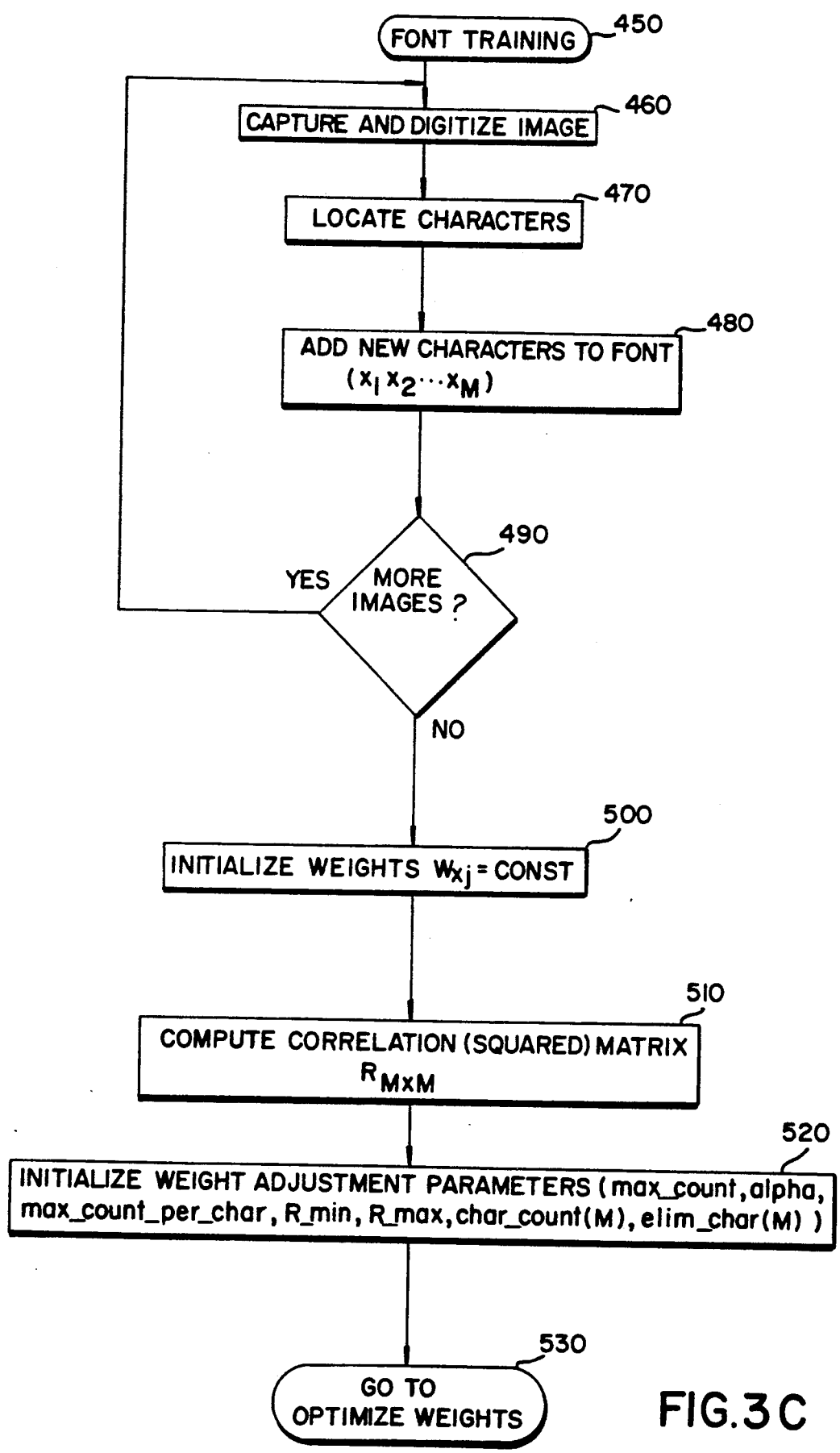

FIG. 3C shows a flow diagram illustrating the font training portion of the logic followed by the logic and control unit 40. Training begins with the font training label 450 and is followed by the capture and digitization of an image 460 step upon the receipt of a part detect signal as discussed previously with reference to FIG. 1 and FIG. 2.

Next, all of the characters are located in a predefined region of interest in the image 470. This is accomplished in exactly the same manner as the procedure described for locating characters in the inspect process of FIG. 3B. The located characters are displayed on the video monitor with a box bounding each character and the user is prompted for a label for each character. The pixel data for each character are then extracted from the image and saved as a trained character in the Font Memory 170 portion of the logic and control unit 480. In this manner, the font is built of trained characters for every image of the training set 490. Once the font has been defined, the weights can be adjusted for each trained character. For every trained character in the font, the weights are initialized to a constant value 500. The module init_pattern of the program in Appendix A performs this task.

Next, a correlation matrix $R_{MxM}$ of size MxM is computed 510. The correlation matrix contains the correlation score of every trained character with every other trained character in the font. The individual correlation scores are computed according to equation (17). The C program module get_R_matrix of Appendix A performs these computations.

Prior to adjusting the weights, several parameters must be initialized 520. These parameters include: max_count sets the total number of iterations; max_count_per_char sets the number of iterations allowed for each of the M trained characters in the font; alpha defines the scaling factor that is applied to the gradient when added to the old weights according to equation (20); R_min is the desired correlation score for each trained character after weight adjustment; R_max is the maximum value of the correlation matrix $R_{M \times M}$; char_count[M] and elim_char[M] are arrays that are initialized to zero and are used to determine if a trained character has exceeded the parameter max_count_per_char. The modules main and optimize_R of the computer program in Appendix A show the initialization of these parameters. The next step is to optimize the weights as indicated by the label 530.

Figure 3D:
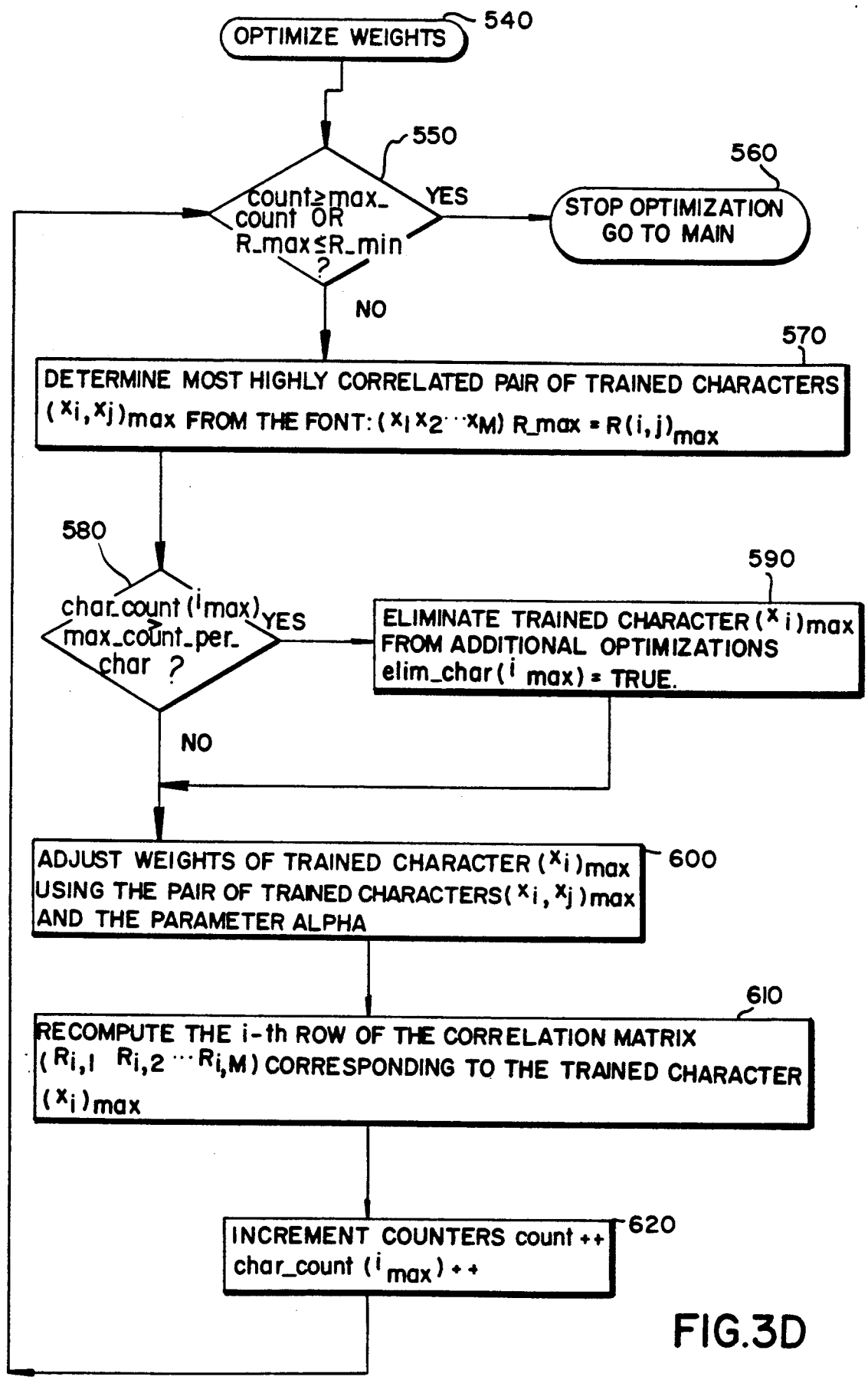

FIG. 3D shows a flow diagram that illustrates how the weights are adjusted for each trained character by the logic and control unit 40. The label optimize weights 540 indicates the start of this process. The process begins by testing whether the iteration count has exceed the parameter max_count or whether the maximum value of the correlation matrix R_max is less than the minimum desired correlation R_min 550. If either of these tests are true then the weight adjustment process is done and control returns to main 560. Otherwise, the most highly correlated pair of trained characters $(x_i, X_j)_{max}$ is determined by finding the largest entry of the font correlation matrix $R_{M \times M}$ 570. The main diagonal terms (correlation score = 100) are eliminated during this search. Also eliminated are any trained characters whose count has previously exceeded the parameter max_count_per_char. The trained character $(x_i)_{max}$ corresponding to row i of the correlation matrix containing the maximum entry is thus selected as the trained character for weight adjustment. A test is performed first to check that the trained character $(x_i)_{max}$ has been called too many times 580. If it has, then it is eliminated from any further weight adjustment 590. Otherwise processing continues. For the program in Appendix A, the above three steps are handled by the module optimize_R.

The next step is the adjustment of the weights of the trained character $(x_i)_{max}$ using the trained character pair $(x_i, x_j)_{max}$ and the parameter alpha 600 by evaluating equations (19) and (20). The module adjust_weight of the program in Appendix A adjusts the weights by computing the gradient (equation (19)) and adjusting the weight vector (equation (20)). The module adjust_weight maintains the weights in the range of zero to 255, i.e. negative weights are not permitted, nor are weights above a maximum value (255). This is done to permit storing the weights in finite word length (8 bit) Font Memory 170.

The i-th row of the correlation (squared) matrix, corresponding to trained character $(x_i)_{max}$, is recomputed next 610. The program module redo_R_matrix of Appendix A performs this task. Finally the iteration counters count and char_count[i_max] are incremented 620 and the logic and control unit branches back to the test 550 for another possible iteration.

FIG. 4 shows an example of applying the weight adjustment procedure to a three character font. The font is composed of the trained characters 'O', 'Q', and 'D'. The mean patterns for three characters 630, 640, and 650 are seven pixels high by five pixels wide. The light value (intensity) of each pixel is digitized to 8 bits, i.e. 256 levels of gray. Note that the Q is distinguished from the O by only two pixels, the D is distinguished from the O by only two pixels and the D is distinguished from the Q by four pixels.

The initial weights of the O 660, Q 670, and D 680, are shown initialized to a constant value of 128 (i.e. half of full scale). The initial correlation (squared) matrix $R_{3 \times 3}$ 690 shows high correlations among all three trained characters, especially the O and the Q.

The weights are adjusted as described above with regards to FIG. 3C and FIG. 3D and the computer program of Appendix A. The parameters are initialized as follows: max_count = 200, R_min = 1, and alpha = 0.001. The final correlation matrix 700 shows that the three trained characters are essentially completely decorrelated since all off-diagonal terms are essentially zero. The final weight pattern for the O 710 shows that more emphasis is placed on the four pixels that distinguish the O from the Q and the D. In a similar manner, more emphasis is placed on the two pixels that sufficiently distinguish the Q 720 from the O and the D. Also there are only two pixels that distinguish the D 730 from the O and the Q.

FIG.'s 5A thru 5E show an example of applying the weight adjustment procedure for a sixteen character font. The mean patterns for the sixteen trained characters are shown in FIG. 5A. The characters are: 0 740, 1 741, 8 742, 9 743, B 744, C 745, D 746, E 747, F 748, G 749, I 750, O 751, P 752, Q 753, R 754, and T 755. Each character is seven pixels high by five pixels wide. The light value (intensity) of each pixel is digitized to 8 bits (256 gray levels).

The initial weight patterns for the sixteen trained characters are shown in FIG. 5B (760 thru 775). All sixteen weight patterns are initialized to a constant value of 128. The weights are stored as unsigned bytes (8 bit words) and thus the permissible range of the weights is from 0 to 255. The initial value of 128 is half of the full scale value and provides for maximum adjustment in either the positive or negative direction.

The initial correlation (squared) matrix $R_{16 \times 16}$ 780, shown in FIG. 5C, was computed using equation (17) using the computer program of Appendix A. The high off-diagonal terms of this matrix indicates significant correlations. The goal is to reduce the value of these off-diagonal terms by placing more emphasis (increasing the weights) on those pixels that distinguish one trained character from another. The weight adjustment procedure illustrated in FIG. 3C and FIG. 3D was applied with the following parameters: R_min = 1, max_count = 6400, max_count_per_char = 400, alpha = 0.001. With these parameters, after 3900 iterations, the weight adjustment process stopped.

The final correlation (squared) matrix $R_{16 \times 16}$ 790, is shown in FIG. 5D. The off-diagonal terms for all of the trained characters in the font are reduced compared to the initial correlation (squared) matrix 780. However, some of the terms are not reduced to the desired level of R_min = 1. In particular, the correlation scores along a row corresponding to the characters: 0 791, 8 792, B 793, D 794, E 795, I 796, P 797, Q 798, and R 799 are higher than desired. These scores are not reduced any further since the the number of iterations for each trained character exceeded the parameter max_count_per_char, and hence each of these trained characters were eliminated from further weight adjustment. Close examination of the weight adjustment process shows that contradictory weight adjustments occur for various combinations of trained character pairs which leads to oscillations. Hence, no further improvement in reducing the correlation scores can be obtained without eliminating the trained character pairs causing the oscillations from the optimization set.

The final weight patterns are shown in FIG. 5E for the sixteen trained characters 800 thru 815. Inspection of these weights shows which pixels provide the most discrimination of each trained character from every other trained character in the font. For example, the weight pattern for the O 811 has seven pixels with significant weight. It is clear from inspection of the patterns and the initial correlation matrix these pixels were selected to reduce the high correlations with the O, C, D, and Q. The weight patterns for the other trained characters can be analyzed in a similar manner.

In the above examples, some of the weights were reduced to zero value. In actual practice, this would be prevented since each pixel provides some information in recognizing a trained character and the redundancy helps reduce the influence of noise. The amount of weight adjustment can be controlled by properly setting the R_min parameter.

The invention has been described in detail with particular reference to a preferred embodiment thereof, but it will be understood that variations and modifications can be effected within the spirit and scope of the invention. Such variations could include, but are not limited to, document scanners which scan the document with a linear, one dimensional, scanner one line at a time and build the image sequentially in a digital frame store. For example, the documents could contain text composed of multiple fonts with various styles such as bold, or italic.

APPENDIX A

```
/* Routine to test weighted correlation optimization */
/* gjm    5-23-91 */ include <stdio.h>
include "corr.h"

main()
{
struct model pattern[NO_CHARS];
int R_matrix[NO_CHARS][NO_CHARS];

int R_min = 1;
int max_count = 6400;
float alpha = 0.001;

init_pattern(pattern);
list_pattern(pattern);
get_R_matrix(pattern,R_matrix);
list_R_matrix(R_matrix);
getchar();
optimize_R(R_matrix, pattern, max_count, R_min, alpha);
list_weight(pattern);
}                                // end of main // corr.h
// header file for corr.prj
// gjm  5-30-91 define WIDTH  5
define HEIGHT 7
define NO_CHARS 16 struct model {
            char label;
            long mean[HEIGHT][WIDTH];
            long weight[HEIGHT][WIDTH];
                };

void  get_R_matrix(struct model pattern[], int R_matrix[][NO_CHARS]);
void  redo_R_matrix(struct model pattern[], int R_matrix[][NO_CHARS], int i_max);
void  list_R_matrix(int R_matrix[][NO_CHARS]);
```

```c
int   corr(struct model pattern0, struct model pattern1);  // computes correlations
float sum_sq(struct model y, struct model x, struct model w);  // compute weighted sum of squares
float sum(struct model x, struct model w);        // compute weighted means
void  adjust_weight(int row, int col, int R_matrix[][NO_CHARS],
                    struct model* pat_row, struct model* pat_col, float alpha);
void  compute_gradient(int row, int col, int R_matrix[][NO_CHARS],
                    struct model* pat_row, struct model* pat_col,
                    float grad[][WIDTH]);
float mean(struct model x);       // compute unweighted means
void  optimize_R(int R_matrix[][NO_CHARS], struct model pattern[],
                    int max_count, int R_min, float alpha);
void  init_pattern(struct model* pattern);
void  list_pattern(struct model* pattern);
void  list_weight(struct model* pattern);
// correl.cpp
// computes correlations
// gjm 5-30-91 include <stdio.h>
include <math.h>
#include "corr.h"

void get_R_matrix(struct model pattern[], int R_matrix[][NO_CHARS])
{
int i,j;
        for (i = 0; i < NO_CHARS; i++)
            {
            for (j = 0; j < NO_CHARS; j++)
                {
                if ( i == j )
                    R_matrix[i][j] = 100;
                else
                    R_matrix[i][j] = corr(pattern[j],pattern[i]);
                }
            }
} void redo_R_matrix(struct model pattern[], int R_matrix[][NO_CHARS], int i_max)
{
int j;
        for (j = 0; j < NO_CHARS; j++)
            {
            if ( j == i_max )
                R_matrix[i_max][j] = 100;
            else
                R_matrix[i_max][j] = corr(pattern[j],pattern[i_max]);
            }
} void list_R_matrix(int R_matrix[][NO_CHARS])
{
```

```
int i,j;
        printf("Corr  matrix:\n");
        for (i = 0; i < NO_CHARS; i++)
            { for (j = 0; j < NO_CHARS; j++)
                {
                printf("%3d ", R_matrix[i][j]);
                }
        printf("\n");
            }
} int  corr(struct model pattern0, model pattern1)  // computes correlations
{
float  sumsq_00, sumsq_11, sumsq_01;
sumsq_00 = sum_sq(pattern0, pattern0, pattern1);  // uses pattern1 weights
sumsq_11 = sum_sq(pattern1, pattern1, pattern1);  // ibid
sumsq_01 = sum_sq(pattern0, pattern1, pattern1);  // ibid
sumsq_01 = sumsq_01 * sumsq_01 *100.;
if   (sumsq_00 == 0. || sumsq_11 == 0.)
        return 0;
else
        return (int) (sumsq_01/(sumsq_00 * sumsq_11));
} float sum_sq(struct model y, struct model x, struct model w)   // compute weighted sum of squares
{
int  i, j;
float sum_x, sum_y, sum_sq_tmp = 0., temp, x_prime, y_prime;
sum_x = sum(x,w);
sum_y = sum(y,w);
        for (i = 0; i < HEIGHT; i++)
            { for (j = 0; j < WIDTH; j++)
                {
            x_prime     = (float) (x.mean[i][j])*(w.weight[i][j]);
            y_prime     = (float) (y.mean[i][j])*(w.weight[i][j]);
            temp        = (x_prime - sum_x) * (y_prime - sum_y);
            temp        = temp/(255.);   // unscale temp by 255
            sum_sq_tmp = sum_sq_tmp + temp;
                }
            }
        return (sum_sq_tmp/65025.);   // unscale by 255^2
} float sum(struct model x, struct model w)        // compute weighted means
{
int  i, j;
```

```
float temp = 0.;
        for (i = 0; i < HEIGHT; i++)
            { for (j = 0; j < WIDTH; j++)
                {
                    temp = temp + (float) (x.mean[i][j])*(w.weight[i][j]);
                }
            }
        return (temp/( (float) (HEIGHT * WIDTH)));
} void adjust_weight(int row, int col, int R_matrix[][NO_CHARS],
                    struct model* pat_row,
                    struct model* pat_col, float alpha)
{
int i,j;
float gradient[HEIGHT][WIDTH], temp;
long new_weight = 0;

compute_gradient(row, col, R_matrix, pat_row, pat_col, gradient);

for (i = 0; i < HEIGHT; i++)
            { for (j = 0; j < WIDTH; j++)
                {
                temp = (float) pat_row->weight[i][j];
                temp = temp * temp;
                temp = temp - alpha * gradient[i][j];
                if ( temp < 0. )
                        temp = 0.00001;
                new_weight = (long) sqrt((double)temp);
                if ( new_weight < 0 )
                        new_weight = 0;
                if ( new_weight > 255 )
                        new_weight = 255;
                pat_row->weight[i][j] = new_weight;
                }
            }
} void compute_gradient(int row, int col, int R_matrix[][NO_CHARS],
                    struct model* pat_row, struct model* pat_col,
                    float grad[][WIDTH])
{
int i,j;
float temp, mean_row, mean_col, sumsq_row, sumsq_col, sumsq_rc, x, y;
float term1, term2, term3;
float scale = 255.;              // scale factor for weight^2 (255^2)
```

```
mean_row    = mean(*pat_row);
mean_col    = mean(*pat_col);
sumsq_row            = sum_sq(*pat_row, *pat_row, *pat_row);
sumsq_col   = sum_sq(*pat_col, *pat_col, *pat_row);
sumsq_rc    = sum_sq(*pat_col, *pat_row, *pat_row);

for (i = 0; i < HEIGHT; i++)
            { for (j = 0; j < WIDTH; j++)
                {
                x = (float) pat_row->mean[i][j];
                x = x - mean_row;
                y = (float) pat_col->mean[i][j];
                y = y - mean_col;
                if (sumsq_rc == 0.)
                        term1 = 0.;
                else
                        term1 = 2.*x*y/sumsq_rc;
                if (sumsq_row == 0.)
                        term2 = 0.;
                else
                        term2 =    x*x/sumsq_row;
                if (sumsq_rc == 0.)
                        term3 = 0.;
                else
                        term3 =    y*y/sumsq_col;
                grad[i][j] = ((float) R_matrix[row][col])*scale*
                            (term1 - term2 -term3);
                }
            }

} float mean(struct model x)        // compute unweighted means
{
int i, j;
float temp = 0.;
        for (i = 0; i < HEIGHT; i++)
            { for (j = 0; j < WIDTH; j++)
                    {
                    temp = temp + (float) (x.mean[i][j]);
                    }
            }
        return (temp/( (float) (HEIGHT * WIDTH)));
}
void optimize_R(int R_matrix[][NO_CHARS], struct model pattern[], int max_count,
            int R_min, float alpha)
{
int i, j, k = 0, i_max = 0, j_max = 0, R_max, count[NO_CHARS], elim_char[NO_CHARS];
int char_limit = max_count/NO_CHARS;    // don't let any one char iterate more than char_limit times
```

```
for (i = 0; i < NO_CHARS; i++)
        {
        count[i] = 0;
        elim_char[i] = 0;
        }

R_max = 100;
    while ( (k++ < max_count) && (R_max > R_min) )
        {
        R_max = 0;
        printf("count:   %4d\b\b\b\b\b\b\b\b\b\b",  k);
        for (i = 0; i < NO_CHARS; i++)                    // find max R
                { for (j = 0; j < NO_CHARS; j++)
                        {
                        if ( (i != j) && (R_matrix[i][j] > R_max)
                                        && (elim_char[i] != 1) )
                          {
                          R_max = R_matrix[i][j];
                          i_max = i;
                          j_max = j;
                          }
                        }
                } count[i_max]++;       // increment counter for char i_max if ( count[i_max] > char_limit )
          {
          printf("\nchar limit exceeded for char %c\n", pattern[i_max].label);
//        getchar();
          elim_char[i_max] = 1;
          adjust_weight(i_max, j_max, R_matrix, &pattern[i_max], &pattern[j_max],
                    alpha);

/*        printf("i_max: %d j_max: %d\n\n", i_max, j_max);
          printf("char: %c\n", pattern[i_max].label);

for (i = 0; i < HEIGHT; i++)
                  { for (j = 0; j < WIDTH; j++)
                          {
                          printf("%d\t",  pattern[i_max].weight[i][j]);
                          }
                  printf("\n");
                  }
*/
//      getchar();

redo_R_matrix(pattern,  R_matrix,i_max);
//        list_R_matrix(R_matrix);
```

```
/ /         getchar();
           } printf("FINAL COUNT: %d\n", k);
           printf("\n   count[i]:\n");
           for (i = 0; i < NO_CHARS; i++)
                   printf("%5d ", count[i]);
           printf("\n   elim_char[i]:\n");
           for (i = 0; i < NO_CHARS; i++)
                   printf("%5d ", elim_char[i]);
           getchar();
           list_R_matrix(R_matrix);
           getchar();
}
// pattern.cpp
// creates and lists test characters (7 x 5)
// gjm     5-30-91 include <stdio.h>
include "corr.h"

void init_pattern(struct model* pattern)
{
  int i,j;

long O_M[7][5] =            {   0,128,128,128,   0,
                              128,  0,  0,  0,128,
                              128,  0,  0,  0,128,
                              128,  0,  0,  0,128,
                              128,  0,  0,  0,128,
                              128,  0,  0,  0,128,
                                0,128,128,128,   0};

long Weight[7][5] =         {128,128,128,128,128,
                             128,128,128,128,128,
                             128,128,128,128,128,
                             128,128,128,128,128,
                             128,128,128,128,128,
                             128,128,128,128,128,
                             128,128,128,128,128};

long Q_M[7][5] =            {  0, 64, 64, 64,  0,
                              64,  0,  0,  0, 64,
                              64,  0,  0,  0, 64,
                              64,  0,  0,  0, 64,
                              64,  0,  0,  0, 64,
                              64,  0,  0, 64, 64,
                               0, 64, 64, 64, 64};

long D_M[7][5] =            {255,255,255,255,   0,
                             255,  0,  0,  0,255,
```

```
                              255,  0,  0,  0,255,
                              255,  0,  0,  0,255,
                              255,  0,  0,  0,255,
                              255,  0,  0,  0,255,
                              255,255,255,255,  0};

long Eight_M[7][5] =          {  0,255,255,255,  0,
                              255,  0,  0,  0,255,
                              255,  0,  0,  0,255,
                                0,255,255,255,  0,
                              255,  0,  0,  0,255,
                              255,  0,  0,  0,255,
                                0,255,255,255,  0};

long Nine_M[7][5] =           {  0,255,255,255,  0,
                              255,  0,  0,  0,255,
                              255,  0,  0,  0,255,
                                0,255,255,255,  0,
                                0,  0,  0,  0,255,
                                0,  0,  0,  0,255,
                                0,255,255,255,  0};

long Zero_M[7][5] =           {  0,255,255,255,  0,
                              255,  0,  0,  0,255,
                              255,  0,  0,255,255,
                              255,  0,255,  0,255,
                              255,255,  0,  0,255,
                              255,  0,  0,  0,255,
                                0,255,255,255,  0};

long B_M[7][5] =              {255,255,255,255,  0,
                              255,  0,  0,  0,255,
                              255,  0,  0,  0,255,
                              255,255,255,255,  0,
                              255,  0,  0,  0,255,
                              255,  0,  0,  0,255,
                              255,255,255,255,  0};

long E_M[7][5] =              {255,255,255,255,255,
                              255,  0,  0,  0,  0,
                              255,  0,  0,  0,  0,
                              255,255,255,255,  0,
                              255,  0,  0,  0,  0,
                              255,  0,  0,  0,  0,
                              255,255,255,255,255};
```

```
long F_M[7][5] =        {255,255,255,255,255,
                         255,  0,  0,  0,  0,
                         255,  0,  0,  0,  0,
                         255,255,255,255,  0,
                         255,  0,  0,  0,  0,
                         255,  0,  0,  0,  0,
                         255,  0,  0,  0,  0};

long P_M[7][5] =        {255,255,255,255,  0,
                         255,  0,  0,  0,255,
                         255,  0,  0,  0,255,
                         255,255,255,255,  0,
                         255,  0,  0,  0,  0,
                         255,  0,  0,  0,  0,
                         255,  0,  0,  0,  0};

long R_M[7][5] =        {255,255,255,255,  0,
                         255,  0,  0,  0,255,
                         255,  0,  0,  0,255,
                         255,255,255,255,  0,
                         255,  0,255,  0,  0,
                         255,  0,  0,255,  0,
                         255,  0,  0,  0,255};

long C_M[7][5] =        {  0,255,255,255,  0,
                         255,  0,  0,  0,255,
                         255,  0,  0,  0,  0,
                         255,  0,  0,  0,  0,
                         255,  0,  0,  0,  0,
                         255,  0,  0,  0,255,
                           0,255,255,255,  0};

long G_M[7][5] =        {  0,255,255,255,  0,
                         255,  0,  0,  0,255,
                         255,  0,  0,  0,  0,
                         255,  0,  0,  0,  0,
                         255,  0,255,255,255,
                         255,  0,  0,  0,255,
                           0,255,255,255,  0};

long I_M[7][5] =        {255,255,255,255,255,
                           0,  0,255,  0,  0,
                           0,  0,255,  0,  0,
                           0,  0,255,  0,  0,
                           0,  0,255,  0,  0,
                           0,  0,255,  0,  0,
                         255,255,255,255,255};
```

```
long T_M[7][5] =           {255,255,255,255,255,
                              0,  0,255,  0,  0,
                              0,  0,255,  0,  0,
                              0,  0,255,  0,  0,
                              0,  0,255,  0,  0,
                              0,  0,255,  0,  0,
                              0,  0,255,  0,  0};

long One_M[7][5] =         {  0,  0,255,  0,  0,
                              0,255,255,  0,  0,
                            255,  0,255,  0,  0,
                              0,  0,255,  0,  0,
                              0,  0,255,  0,  0,
                              0,  0,255,  0,  0,
                            255,255,255,255,255};

for (i = 0; i < HEIGHT; i++)
            { for (j = 0; j < WIDTH; j++)
                {
                    pattern->label      =    '0';
                    pattern->mean[i][j] =    Zero_M[i][j];
                    pattern->weight[i][j] =  Weight[i][j];
                }
            } pattern++;

for (i = 0; i < HEIGHT; i++)
            { for (j = 0; j < WIDTH; j++)
                {
                    pattern->label      =    '1';
                    pattern->mean[i][j] =    One_M[i][j];
                    pattern->weight[i][j] =  Weight[i][j];
                }
            } pattern++;

for (i = 0; i < HEIGHT; i++)
            { for (j = 0; j < WIDTH; j++)
                {
                    pattern->label      =    '8';
                    pattern->mean[i][j] =    Eight_M[i][j];
                    pattern->weight[i][j] =  Weight[i][j];
                }
            } pattern++;
```

```
for (i = 0; i < HEIGHT; i++)
        { for (j = 0; j < WIDTH; j++)
                {
                    pattern->label      =    '9';
                    pattern->mean[i][j] =    Nine_M[i][j];
                    pattern->weight[i][j] =  Weight[i][j];
                }
        } pattern++;

for (i = 0; i < HEIGHT; i++)
        { for (j = 0; j < WIDTH; j++)
                {
                    pattern->label      =    'B';
                    pattern->mean[i][j] =    B_M[i][j];
                    pattern->weight[i][j] =  Weight[i][j];
                }
        } pattern++;

for (i = 0; i < HEIGHT; i++)
        { for (j = 0; j < WIDTH; j++)
                {
                    pattern->label      =    'C';
                    pattern->mean[i][j] =    C_M[i][j];
                    pattern->weight[i][j] =  Weight[i][j];
                }
        } pattern++;

for (i = 0; i < HEIGHT; i++)
        { for (j = 0; j < WIDTH; j++)
                {
                    pattern->label      =    'D';
                    pattern->mean[i][j] =    D_M[i][j];
                    pattern->weight[i][j] =  Weight[i][j];
                }
        } pattern++;

for (i = 0; i < HEIGHT; i++)
        { for (j = 0; j < WIDTH; j++)
                {
```

```
                    pattern->label      =   'E';
                    pattern->mean[i][j]  =   E_M[i][j];
                    pattern->weight[i][j] =  Weight[i][j];
                    }
          } pattern++;

for (i = 0; i < HEIGHT; i++)
          { for (j = 0; j < WIDTH; j++)
                    {
                    pattern->label      =   'F';
                    pattern->mean[i][j]  =   F_M[i][j];
                    pattern->weight[i][j] =  Weight[i][j];
                    }
           } pattern++;

for (i = 0; i < HEIGHT; i++)
          { for (j = 0; j < WIDTH; j++)
                    {
                    pattern->label      =   'G';
                    pattern->mean[i][j]  =   G_M[i][j];
                    pattern->weight[i][j] =  Weight[i][j];
                    }
          } pattern++;

for (i = 0; i < HEIGHT; i++)
          { for (j = 0; j < WIDTH; j++)
                    {
                    pattern->label      =   'I';
                    pattern->mean[i][j]  =   I_M[i][j];
                    pattern->weight[i][j] =  Weight[i][j];
                    }
          } pattern++;

for (i = 0; i < HEIGHT; i++)
          { for (j = 0; j < WIDTH; j++)
                    {
                    pattern->label      =   'O';
                    pattern->mean[i][j]  =   O_M[i][j];
                    pattern->weight[i][j] =  Weight[i][j];
```

}           }

```
        pattern++;

for (i = 0; i < HEIGHT; i++)
                { for (j = 0; j < WIDTH; j++)
                        {
                        pattern->label      =      'P';
                        pattern->mean[i][j]  =     P_M[i][j];
                        pattern->weight[i][j] =    Weight[i][j];
                        }
                } pattern++;

for (i = 0; i < HEIGHT; i++)
                { for (j = 0; j < WIDTH; j++)
                        {
                        pattern->label      =      'Q';
                        pattern->mean[i][j]  =     Q_M[i][j];
                        pattern->weight[i][j] =    Weight[i][j];
                        }
                } pattern++;

for (i = 0; i < HEIGHT; i++)
                { for (j = 0; j < WIDTH; j++)
                        {
                        pattern->label      =      'R';
                        pattern->mean[i][j]  =     R_M[i][j];
                        pattern->weight[i][j] =    Weight[i][j];
                        }
                } pattern++;

for (i = 0; i < HEIGHT; i++)
                { for (j = 0; j < WIDTH; j++)
                        {
                        pattern->label      =      'T';
                        pattern->mean[i][j]  =     T_M[i][j];
                        pattern->weight[i][j] =    Weight[i][j];
                        }
                }

}       // end of init_pattern
```

/* display characters on the monitor */

```c
void list_pattern(struct model* pattern)
{
  int i,j,k;

for (k=0; k < NO_CHARS; k++,pattern++)
    {
       printf("char = %c\n", pattern->label);

for (i = 0; i < HEIGHT; i++)
                      { for (j = 0; j < WIDTH; j++)
                              {
                              printf("%3d ", pattern->mean[i][j]);
                              }
                         printf("\n");
                      } printf("\n");

for (i = 0; i < HEIGHT; i++)
                      { for (j = 0; j < WIDTH; j++)
                              {
                              printf("%3d ", pattern->weight[i][j]);
                              }
                         printf("\n");
                      }
    getchar();
   }

}          // end of list_pattern void list_weight(struct model* pattern)
{
  int i,j,k;

for (k=0; k < NO_CHARS; k++,pattern++)
   {
       printf("char = %c\n", pattern->label);

for (i = 0; i < HEIGHT; i++)
                      { for (j = 0; j < WIDTH; j++)
                              {
                              printf("%3d ", pattern->weight[i][j]);
                              }
```

```
        printf("\n");
    }
    getchar();
    }
}                    // end of list_weight
```

We claim:

1. A method of character recognition, comprising the steps of:
   1) creating a font of trained characters by:
      (a) acquiring an image composed of a two dimensional array of pixels;
      (b) locating all of the characters in the image by selectively scanning columns or rows of a predetermined area of the image and comparing each pixel's intensity with a reference level to determine the first pixel of each character and recording the location (column and row coordinates) of such pixel and identifying the other pixels adjacent to the first whose intensity also exceeds the reference level and recording the upper left and lower right coordinates of a box bounding each character;
      (c) identifying (labeling) all located characters and entering such identified characters as trained characters in memory;
      (d) creating a set of weights, initialized to a constant value, for all trained characters of the training set;
      (e) computing a correlation matrix composed of weighted correlation coefficients for all possible pairs of trained characters comprising the trained character set;
      (f) searching through the correlation matrix and identifying the character corresponding to the row of the correlation matrix containing the most highly correlated pair of trained characters;
      (g) adjusting the weights of the trained character identified in (f);
      (h) recomputing the row of the correlation matrix corresponding to the trained character identified in (f) using the adjusted weights computed in (g); and
      (i) repeating steps (f) through (h) until the highest correlation in the correlation matrix is reduced to an acceptable level or until a maximum count is exceeded and eliminating those trained characters from this iterative process that have been selected an excessive number of times; and
   2) recognizing unknown characters by:
      (j) acquiring a two dimensional array of pixels;
      (k) locating all unknown characters in a manner described in (b);
      (l) computing weighted correlation coefficients using the weights determined in steps (a) through (i) between all unknown characters and the trained character set; and
      (m) identifying all unknown characters as those trained characters with the highest weighted correlation coefficients above a threshold.

2. The method of claim 1 wherein the weights adjusting step (g) includes:
   (a) computing the gradient of the weighted correlation coefficient with respect to the weights for the pair of characters identified in step (f) of claim 1; and
   (b) subtracting a fixed scaled amount of the gradient from the weights of the trained character identified in step (f) of claim 1.

3. The method of claim 1 wherein the weights adjusting step (g) includes:
   (a) computing the gradient of the weighted correlation coefficient with respect to the weights for the pair of characters identified in step (f) of claim 1;
   (b) initializing a scaling constant;
   (c) updating the scaling constant by adding a fixed small number to it;
   (d) multiplying the gradient of step (a) by the scaling constant;
   (e) subtracting the scaled gradient from a temporary version of the weights for the trained character identified in step (f) of claim 1;
   (f) computing a weighted correlation coefficient for the pair of characters identified in step (f) of claim 1;
   (g) saving the scaling constant and the weighted correlation coefficient in memory;
   (h) repeating steps (c) through (g) to cover a range of scaling constants;
   (i) selecting the scaling constant from the range of scaling constants that results in a maximum reduction of the weighted correlation coefficient; and
   (j) using the scaling constant found in (i) to subtract a scaled amount of the gradient from the weights of the trained character identified in step (f) of claim 1.

4. The method of claim 1 wherein the weights adjusting step (g) includes:
   (a) computing the gradient of the weighted correlation coefficient with respect to the weights for the pair of characters identified in step (f) of claim 1;
   (b) initializing a scaling constant;
   (c) undating the scaling constant by adding a fixed small number to it;
   (d) multiplying the gradient of step (a) by the scaling constant;
   (e) subtracting the scaled gradient from a temporary version of the weights for the trained character identified in step (f) of claim 1;
   (f) computing a weighted correlation coefficient for the pair of characters identified in step (f) of claim 1;
   (g) saving the scaling constant and the weighted correlation coefficient in memory;
   (h) repeating steps (c) through (g) to cover a range of scaling constants;
   (i) selecting the scaling constant from the range of scaling constants that results in a maximum reduction of the weighted correlation coefficient; and (j) using a weighted linear combination of the scaling constant found in (i) and a fixed scaling constant to subtract a scaled amount of the gradient from the weights of the trained character identified in step (f) of claim 1.

5. The method of claim 1 wherein the weights adjusting step (g) includes:
 (a) computing the gradient of the weighted correlation coefficient with respect to the weights for the pair of characters identified in step (f) of claim 1;
 (b) determining the scaling constant for the gradient that results in a maximum reduction of the weighted correlation coefficient using Second Order Methods; and
 (c) using the scaling constant found in (b) to subtract a scaled amount of the gradient from the weights of the trained character identified in step (f) of claim 1.

6. The method of claim 1 wherein the character location step (b) is provided by a connectivity algorithm.

7. The method of claim 1 wherein only the weights off the diagonal are adjusted in the weights adjusting step (g).

* * * * *